US009668425B2

(12) United States Patent
Claerhout

(10) Patent No.: US 9,668,425 B2
(45) Date of Patent: Jun. 6, 2017

(54) DEBRIS SCREEN FOR COMBINE HARVESTER GRAIN CLEANING FAN

(71) Applicant: AGCO Corporation, Hesston, KS (US)

(72) Inventor: Bryan S. Claerhout, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 14/870,983

(22) Filed: Sep. 30, 2015

(65) Prior Publication Data
US 2016/0157432 A1 Jun. 9, 2016

Related U.S. Application Data

(60) Provisional application No. 62/087,639, filed on Dec. 4, 2014.

(51) Int. Cl.
A01F 12/54 (2006.01)
A01F 12/44 (2006.01)

(52) U.S. Cl.
CPC .................. A01F 12/444 (2013.01)

(58) Field of Classification Search
CPC .... A01D 41/1252; A01D 75/00; A01D 41/02; A01D 41/12; A01D 41/1276; A01D 75/282; A01F 12/444; A01F 12/44; A01F 12/48; A01F 12/54
USPC .................. 460/16, 117, 100, 102
See application file for complete search history.

(56) References Cited

U.S. PATENT DOCUMENTS 3,094,829 A * 6/1963 Claas ..................... A01D 41/02
460/117
3,333,405 A * 8/1967 Bulin ................... A01D 45/021
460/29
3,402,720 A * 9/1968 Rowland-Hill ......... A01F 12/48
415/121.2
3,527,233 A * 9/1970 Mathews .............. A01F 12/185
460/103
3,566,880 A 3/1971 Riffe
3,603,063 A 9/1971 Stroburg et al.
(Continued)

FOREIGN PATENT DOCUMENTS

CN 103283415 A 9/2013

OTHER PUBLICATIONS

Intellectual Property Office, International Search Report for related UK Application No. GB1423073.4, dated Jun. 10, 2015.

Primary Examiner — Árpád Fábián-Kovács

(57) ABSTRACT

A combine harvester including a frame, threshing apparatus, a grain cleaning system, and, a feederhouse pivotally mounted to the frame on a transverse lift axis. The feederhouse includes a conveyor for conveying cut crop material from a fore opening to an aft opening. The feederhouse is configured to support a cutting header at its forward end. The grain cleaning system includes a transverse cross-flow fan having a debris screen protecting an air inlet channel. The debris screen includes a plurality of elongate transverse screen elements each being mounted to the frame so as to provide a degree of vertical movement freedom with respect to the frame. At least one elastic member is connected between the underside of the feederhouse and the frame and connects the plurality of screen elements. At least one elastic member is stretched as the feederhouse is raised and the vertical spacing between the plurality of screen elements increases.

9 Claims, 3 Drawing Sheets

(56) References Cited

U.S. PATENT DOCUMENTS

| | | | | |
|---|---|---|---|---|
| 3,769,988 | A * | 11/1973 | Burenga | A01D 45/24 |
| | | | | 414/502 |
| 4,442,847 | A * | 4/1984 | Buck | A01F 12/444 |
| | | | | 460/100 |
| 4,657,029 | A * | 4/1987 | Helm | A01F 12/16 |
| | | | | 460/106 |
| 5,769,712 | A * | 6/1998 | Honas | A01F 12/442 |
| | | | | 460/114 |
| 6,036,600 | A * | 3/2000 | Kruckman | A01D 41/1252 |
| | | | | 460/117 |
| 6,361,435 | B1 | 3/2002 | Yamamoto et al. | |
| 6,659,859 | B2 * | 12/2003 | Nieschulze | A01D 75/00 |
| | | | | 460/117 |
| 7,690,974 | B2 * | 4/2010 | Johnson | A01D 75/00 |
| | | | | 280/507 |
| 8,062,109 | B1 * | 11/2011 | Pearson | A01D 41/1252 |
| | | | | 460/59 |
| 2006/0042211 | A1 * | 3/2006 | Heinsey | A01F 12/16 |
| | | | | 56/10.2 J |
| 2006/0090440 | A1 * | 5/2006 | Gullickson | A01D 57/10 |
| | | | | 56/13.9 |
| 2014/0162737 | A1 * | 6/2014 | Stan | A01F 12/444 |
| | | | | 460/1 |
| 2015/0173295 | A1 * | 6/2015 | Unrau | B07B 1/12 |
| | | | | 134/6 |

* cited by examiner

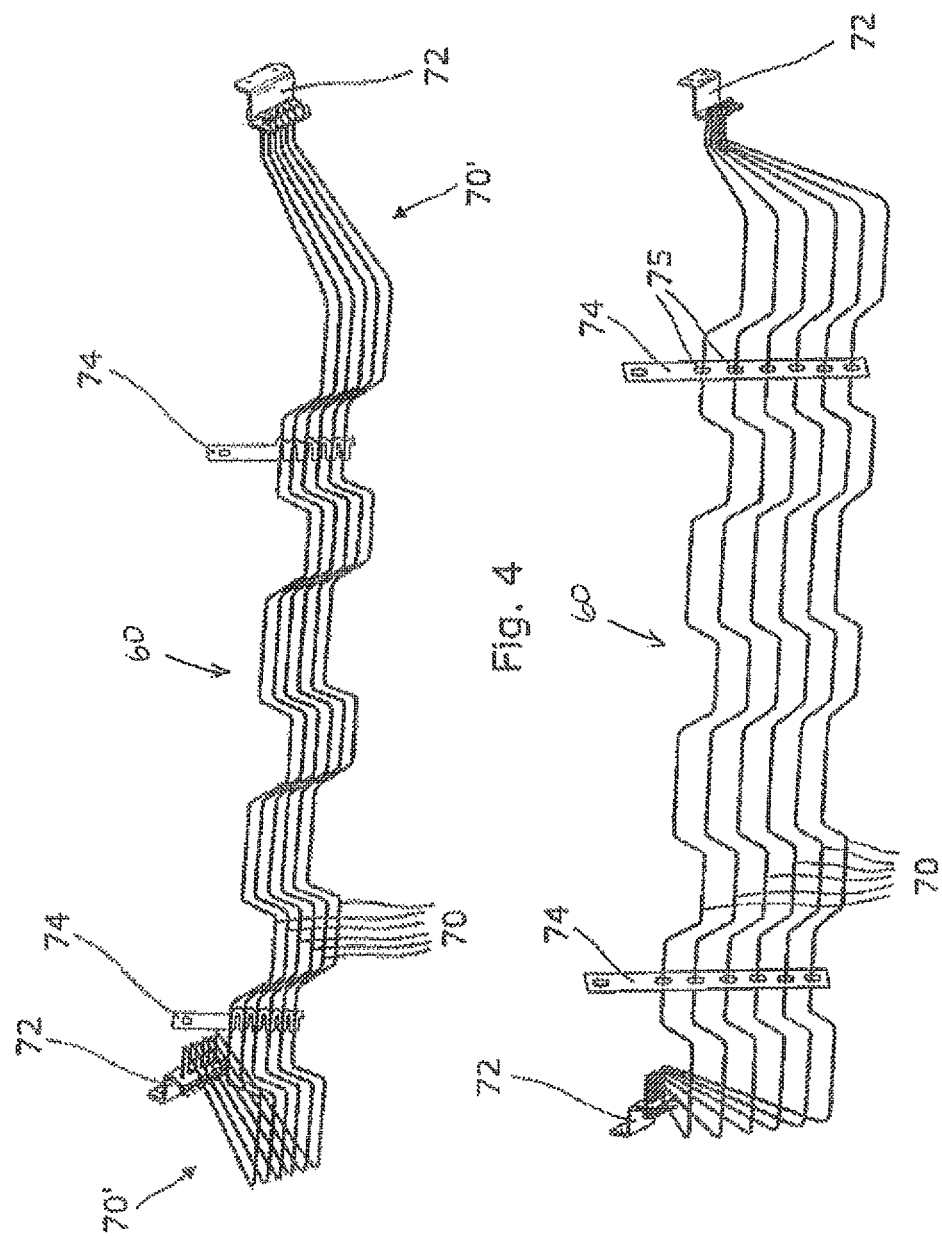

DEBRIS SCREEN FOR COMBINE HARVESTER GRAIN CLEANING FAN

CROSS REFERENCE TO RELATED APPLICATION

This application claims the benefit of U.S. Provisional Application No. 62/087,639, filed Dec. 4, 2014, which is hereby incorporated by reference in its entirety.

FIELD OF INVENTION

The invention relates to combine harvesters and particularly to debris screens for protecting against the ingress of plant material through the air intake of a cross-flow fan in a grain cleaning system.

BACKGROUND

Combine harvesters have been used for decades to cut and thresh crops such as wheat and corn. Mostly self-propelled these days, the typical combine comprises a frame supporting threshing/separating apparatus, a cleaning system (or shoe), an on-board tank for storing the collected grain, and an unloading system. A feederhouse is pivotally mounted to the front of the frame for supporting a cutting header and conveying crop material from the header to the threshing apparatus, generally by means of an enclosed chain and slat elevator. The general operation of combine harvesters is well known and will not be repeated here in detail.

The cleaning system normally includes a fan for generating a cleaning airstream which is directed through the falling grain to blow lighter chaff and the like out of the rear of the shoe. One common type of fan employed is a cross-flow fan which is arranged transversely (width-wise) in the front of the cleaning system, and often behind the combine rear axle. Air is drawn tangentially into a fan housing through a wide inlet which extends across the front of the housing, and exhausted generally rearwardly into the cleaning shoe.

To prevent plant material and the like from entering the cleaning airstream it is known to provide a debris screen across the flow path upstream of the fan air inlet. Due to the close proximity of the screen to the ground, the screen is prone to blocking as material, such as leaves, is held by the pressure differential on the surface of the screen. This problem is compounded by the trend for combines having larger and thus larger cleaning fans demanding higher airflows through the inlet. Once plugged, the combine must be stopped resulting in undesirable downtime and lost harvesting time.

SUMMARY OF INVENTION

It is an object of the invention to provide a combine harvester having an improved debris screen for a cleaning fan inlet which is less prone to plugging.

In accordance with the invention there is provided a combine harvester comprising a frame, threshing apparatus, a grain cleaning system, and, a feederhouse pivotally mounted to the frame on a transverse lift axis, the feederhouse comprising a conveyor for conveying cut crop material from a fore opening to an aft opening, the feederhouse being configured to support a cutting header at its forward end, the grain cleaning system comprising a transverse cross-flow fan having a debris screen protecting an air inlet channel, the debris screen comprising a plurality of elongate transverse screen elements each being mounted to the frame so as to provide a degree of vertical movement freedom with respect to the frame, and at least one elastic member connected between the underside of the feederhouse and the frame and connecting the plurality of screen elements, wherein the at least one elastic member is stretched as the feederhouse is raised and the vertical spacing between the plurality of screen elements increases.

By mounting the debris guard between the frame and the feederhouse several advantageous effects are delivered. Firstly, the screen is located further away from the fan than in known arrangements. Therefore, the sectional area of the air inlet channel, and thus the screen, is larger resulting in a lower pressure differential and reduced risk of material being held on the screen.

Secondly, the screen moves in relation to the frame as the feederhouse is raised and lowered during operation. This movement alone assists in dislodging any plant material held against the screen.

In a preferred embodiment the combine comprises a brush which is mounted in a fixed positional relationship to the frame or feederhouse so as to slide across the debris screen as the feederhouse is raised or lowered.

The fan is preferably located behind a front axle of the frame. In a preferred embodiment the debris screen is mounted to the front axle.

Each screen element may comprise a formed rigid rod which may be made from steel or plastic for example.

Each screen member is preferably pivotally mounted to the frame at each end so as to pivot around a respective generally transverse pivot axis.

Alternatively, each screen member may be slideably mounted between a pair of upright rails fixed to the frame.

The debris screen preferably comprises a plurality of elastic members connected between the underside of the feederhouse and the frame and connecting the plurality of screen elements. The elastic member, or members, may comprise a length of stretchable fabric.

BRIEF DESCRIPTION OF THE DRAWINGS

Further advantages of the invention will become apparent from reading the following description of a specific embodiment with reference to the appended drawings in which:

FIG. 4 is a front perspective view of a debris screen in isolation in accordance with an embodiment of the invention shown in a collapsed state; and, FIG. 5 is a front perspective view of the debris screen of FIG. 4 shown in an extended state.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments. References hereinafter made to certain directions, such as, for example, "front", "rear", "left" and "right", are made as viewed from the side of the combine.

Figure 1:
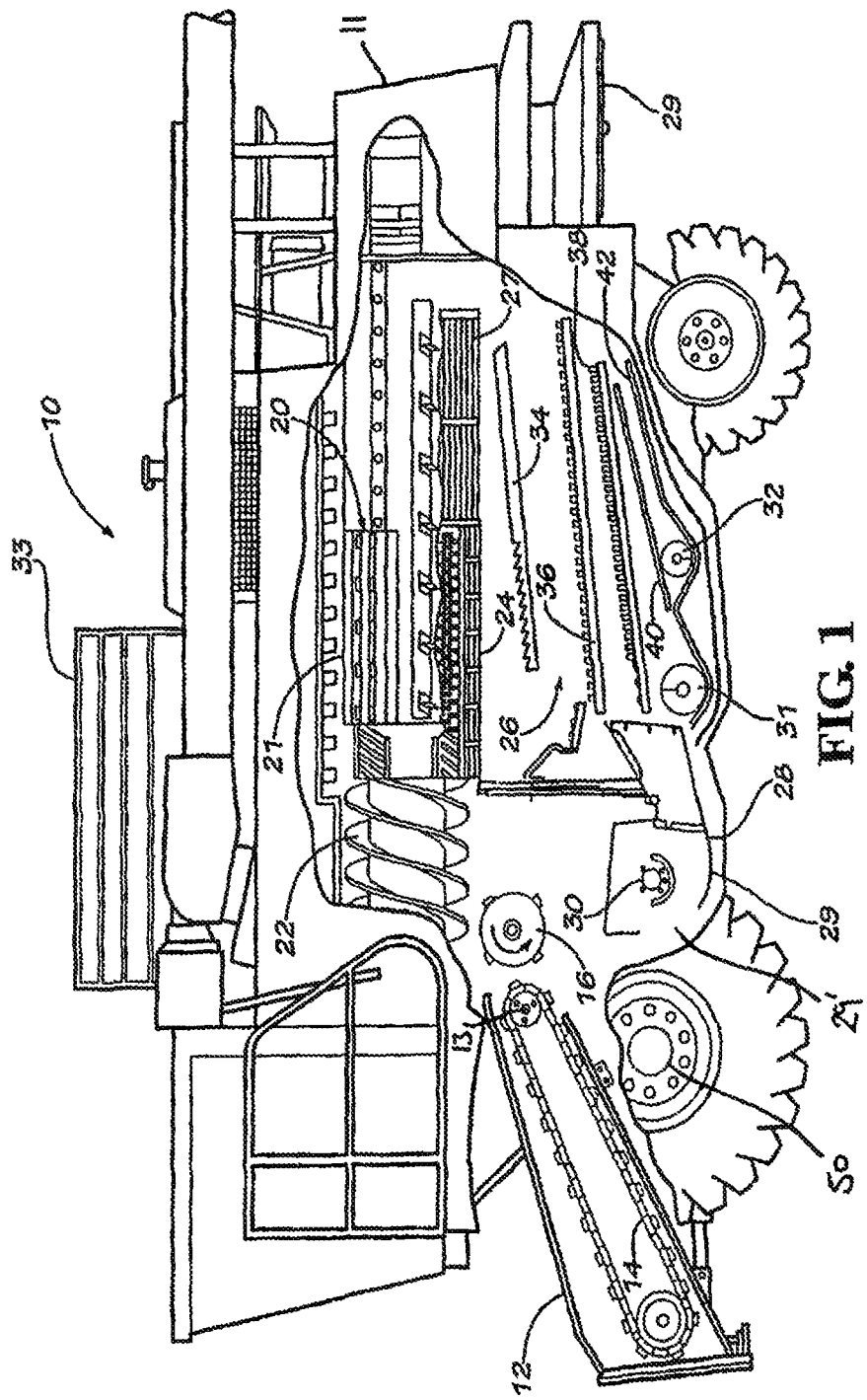
FIG. 1 is a perspective view, partially broken away, of a combine harvester in which the present invention is useful.

FIG. 1 schematically illustrates one type of combine harvester 10 to which the present invention relates. Although the harvester 10 chosen for purposes of illustration is a so-called axial rotary combine in which the threshing mechanism comprises a rotor disposed axially of the machine with respect to its fore-and-aft axis, many other types of threshing and separating mechanisms are currently in commercial use and it is not intended that the principles of the present invention be limited to any one particular type of threshing and separating mechanism.

In relevant part, harvester10 has a frame 11 and a feederhouse 12 that receives harvested materials from a suitable header (not shown) and advances such materials upwardly and rearwardly via a conveyor 14 toward a beater 16 rotating in a counterclockwise direction viewing FIG. 1. Feederhouse 12 is pivotally mounted to the frame 11 about a transverse lift axis 13 which is coaxial with an elevator driveshaft.

Beater 16 impels the harvested materials upwardly and rearwardly into a receiving housing 18. Housing 18 contains the front end of a threshing mechanism, broadly denoted by the numeral 20. In the illustrated embodiment, the threshing mechanism 20 comprises a rotor 21 with a front end having a series of helical vanes 22 that start the materials moving rearwardly in a spiral path of travel along the outside of the rotor 21. As the materials move rearwardly, concaves 24 cooperate with rotor 21 to thresh the materials, and initial separation occurs as grain and smaller residue are pushed through the grated concaves region by centrifugal force to the cleaning apparatus 26. Large residue pieces such as stalks and stems continue to move rearwardly past a separating grate 27 which allows grain to pass radially out of the rotor area to cleaning apparatus 26, but not the larger residue. Such residue eventually discharges out the rear end of the rotor assembly where it is acted upon by a chopper or spreader (now shown) and deposited on the ground. One skilled in the art will understand that other threshing and separating mechanisms 20, such as a cylinder and concaves, may be used without departing from the scope of the invention.

Generally speaking, the threshed grain works its way downwardly through the machine as it is acted upon by the cleaning apparatus 26 which includes a fan 28.

The fan 28 is a cross-flow fan and has a fan housing 29 which contains a rotatable impeller 30 configured to rotate on a transverse axis and generate a high-velocity stream of air. The housing comprises a front opening forming an air inlet 29' through which air is drawn. Air is driven generally tangentially from the inlet 29' to a rear outlet which is in communication with the cleaning system 26.

The light chaff particles become airborne by the rearwardly directed airstream generated by the fan 28 and are discharged out the rear of the machine. Clean grain ultimately finds its way to a discharge auger 31 leading to an elevator that conveys the clean grain up to a storage tank 33 at the top of the machine. Tailings, consisting of some grain along with other particles of residue, find their way to a tailings return auger 32 which then elevates the tailings via means not illustrated for recirculation back through the threshing, separating and cleaning areas to further separate grain from such residue.

The combine harvester 10 includes as part of its cleaning apparatus 26 an upper oscillating pan 34 that delivers materials received from concaves 24 and grate 27 generally downwardly and forwardly. Those materials from pan 34 land on an upper oscillating upper chaffer 36. The upper chaffer 36 allows grain to pass downwardly through openings in the upper chaffer 36 while larger particles are impelled generally upwardly and rearwardly until being discharged off the rear end of the upper chaffer 36 and out the back of the combine harvester 10 to the ground. A finer oscillating lower sieve 38 receives the grain and residue that has passed through the upper chaffer 36 and performs essentially the same type of classifying function as upper chaffer 36. The smaller kernels of grain fall through the lower sieve 38 and onto an oscillating grain pan 40, which delivers the grain into the clean grain auger 30. The larger tailings particles unable to penetrate lower sieve 38 travel off the rear discharge end of lower sieve 38 and drop to a tailings return pan 42 that feeds such materials to the tailings return auger 32. As the kernels of grain gravitate through upper and lower sieves 36 and 38, the airstream from fan 28 entrains the light non-grain particles and carries them out the rear of the machine.

Hydraulic lift cylinders 44 are provided in a known manner between the frame 11 and the feederhouse 12 to raise and lower the feederhouse 12 (and attached header) as required.

Turning attention to the fan 28, air is drawn into the inlet 29' through an air inlet channel in the vicinity of the front axle 50. It should be understood that part of the frame 11 in FIG. 1 is shown as cut away in the vicinity of the front axle 50. However, the side walls 11' of the frame 11 forward of the fan 28 serve to define the side limits of an air inlet passage. The underside of the passage is bounded by a metal grate disposed between front axle 50 and inlet opening 29' whereas the top side is provided by the bottom housing of beater 16.

Turning to FIGS. 2-5, in accordance with the invention a debris screen 60 comprises a plurality (six in this example) of formed wire rods 70 extending across the width of the inlet 29'. The rods 70 are pivotally mounted at each end to a bracket 72, each bracket 72 being fixed to the frame proximate to the front axle 50. The rods 72 are formed with a dog-legged section 70' at each end so that the middle section is offset forwardly from the brackets 72. However, it should be understood that the rods may be formed with a host of different profiles without departing from the scope of the invention. For example, a curved half-moon convex profile may be employed.

The rods 70 are mounted in a manner which gives at least their middle section a degree of vertical movement facilitated by the pivoting relationship with the brackets 72 and the provision of the dog-legged sections 70'.

In an alternative not-illustrated arrangement, the rods 70 may be fixed in a pivoting and sliding relationship with respect to the frame. In this case, straight rods may be employed as the vertical freedom of movement is facilitated by the sliding mechanism.

A pair of elastic fabric straps 74, are connected between the underside of feederhouse 12 and the front axle 50. Each strap includes a plurality of holes 75, wherein each rod 70 passes through a respective hole 75.

The straps 74 serve to maintain a vertical spacing between the rods 70. More or less than the illustrated two straps may be employed.

Figure 2:
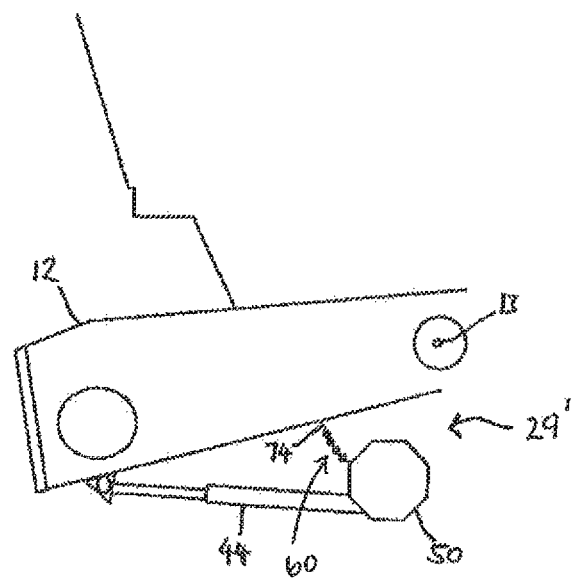
FIG. 2 is a highly schematic side view of the feederhouse and front axle region of a combine harvester embodying the invention and showing the feederhouse in a lowered position.

FIGS. 2 and 4 show the feederhouse 12 in a lowered position (corresponding to a cutting mode) in which the elastic straps 74 are relaxed and the rods 70 rest in a collapsed state.

Figure 3:
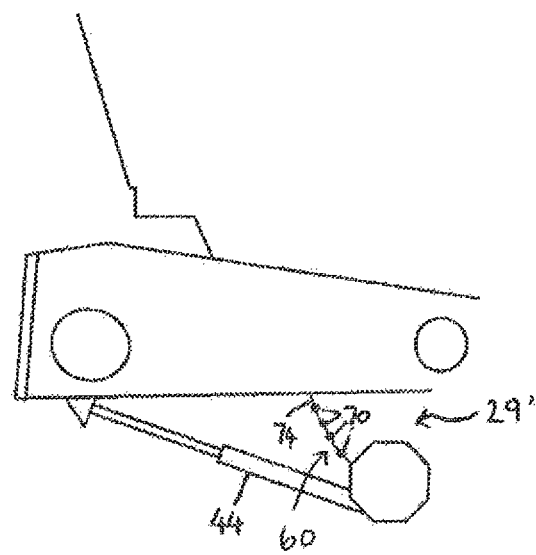
FIG. 3 is a highly schematic side view of the feederhouse and front axle region shown in FIG. 4 but with the feederhouse shown in a raised position.

As the feederhouse (and header) is raised, for example upon reaching the headland, the spacing between the underside of the feederhouse 12 and the front axle increases and, therefore, the elastic straps 74 are stretched as shown in FIGS. 3 and 5. As a result, the vertical spacing of rods 70 is increased.

Advantageously, the relative movement of the rods 70 provides a self-cleaning function wherein leaves, and the like, held against the screen are dislodged at the headland. This ultimately serves to maintain the efficiency of the cleaning fan 28 and reduce machine down time.

In a not illustrated embodiment, a brush or other agitator may be provided against the external surface of the screen so that the brush serves to more effectively dislodge leaves and the like as the feederhouse 12 is raised and lowered.

It should be emphasized that the above-described embodiment of the present disclosure is merely a possible example of implementation, merely set forth for a clear understanding of the principles of the disclosure. Many variations and modifications may be made to the above-described embodiment of the disclosure without departing substantially from the spirit and principles of the disclosure.

The invention claimed is:

1. A combine harvester comprising:
    a frame;
    a threshing apparatus;
    a grain cleaning system; and,
    a feederhouse pivotally mounted to the frame on a transverse lift axis so as to move between a lowered position and a raised position;
        the feederhouse comprising a conveyor for conveying cut crop material from a fore opening to an aft opening;
        the feederhouse being configured to support a cutting header at its forward end;
        the grain cleaning system comprising a transverse cross-flow fan having a debris screen protecting an air inlet;
        the debris screen comprising a plurality of elongate transverse wire rods each being mounted to at least one bracket fixed to the frame so as to provide a degree of vertical movement freedom with respect to the frame, and at least one elastic member connected between the underside of the feederhouse and the frame and connecting the plurality of wire rods;
        wherein the at least one elastic member is stretched as the feederhouse is raised from the lowered position to the raised position, and wherein said stretching of the at least one elastic member causes the vertical spacing between the plurality of wire rods to increase.

2. The combine harvester according to claim 1, wherein the frame comprises a front axle, and wherein the fan is located behind the front axle.

3. The combine harvester according to claim 1, wherein the frame comprises a front axle, and wherein at least one elastic member is attached at one end proximate the front axle.

4. The combine harvester according to claim 1, wherein the at least one bracket comprises a pair of brackets mounted to the frame proximate the front axle and each wire rod is pivotally mounted to one of said pair of brackets at each end so as to pivot around a respective generally transverse pivot axis.

5. The combine harvester according to claim 4, wherein the debris screen comprises a plurality of elastic members connected between the underside of the feederhouse and the frame and connecting the plurality of wire rods.

6. The combine harvester according to claim 1, wherein the at least one elastic member comprises a length of stretchable fabric.

7. The combine harvester according to claim 5, wherein each wire rod of said plurality of wire rods is formed with a dog-legged section at each end so that a middle section of the wire rod is offset forwardly from the pair of brackets so that the middle section of the wire rod has a degree of vertical movement facilitated by the pivoting relationship with the pair of brackets.

8. The combine harvester according to claim 5, wherein each wire rod of said plurality of wire rods is configured so that a middle section of the wire rod has a degree of vertical movement facilitated by the pivoting relationship with the pair of brackets.

9. The combine harvester according to claim 5, wherein each elastic member of said plurality of elastic members includes a plurality of holes, wherein each wire rod passes through a respective hole of said plurality of holes in each elastic member.

* * * * *